United States Patent [19]

Long

[11] Patent Number: 4,753,823
[45] Date of Patent: * Jun. 28, 1988

[54] METHOD FOR PRODUCING ELASTOMER-COATED BIAS FABRIC

[75] Inventor: Delmar D. Long, Rock Hill, S.C.

[73] Assignee: Dayco Products, Inc., Dayton, Ohio

[*] Notice: The portion of the term of this patent subsequent to Nov. 11, 2003 has been disclaimed.

[21] Appl. No.: 883,900

[22] Filed: Jul. 9, 1986

Related U.S. Application Data

[60] Division of Ser. No. 605,509, Apr. 30, 1984, Pat. No. 4,622,243, which is a continuation-in-part of Ser. No. 350,969, Feb. 22, 1982, Pat. No. 4,501,771, and Ser. No. 533,098, Sep. 16, 1983, Pat. No. 4,490,428.

[51] Int. Cl.⁴ .............................................. B05D 3/12
[52] U.S. Cl. .................................... 427/176; 427/204; 427/381; 427/428; 428/110
[58] Field of Search ............... 427/176, 209, 381, 428; 428/110

[56] References Cited

U.S. PATENT DOCUMENTS

| | | | |
|---|---|---|---|
| 1,323,212 | 11/1919 | Bulley . | |
| 3,784,427 | 1/1974 | Griffin | 156/139 |
| 3,832,210 | 8/1974 | Rohlfing | 117/4 |
| 4,062,989 | 12/1977 | Long | 427/176 |
| 4,116,159 | 9/1978 | Long | 118/34 |
| 4,205,559 | 6/1980 | Long et al. | 74/233 |
| 4,283,455 | 8/1981 | McGee | 428/240 |

Primary Examiner—James J. Bell
Attorney, Agent, or Firm—Joseph V. Tassone

[57] ABSTRACT

A method and apparatus for manufacturing elastomer coated bias fabric are disclosed wherein the fabric is conducted in a horizontal path as it is transversely stretched and coated with an elastomeric composition; using an externally driven roll coater, the elastomeric composition is applied to one surface of the fabric from where it is forced through the interstices of the fabric to the opposite surface whereby both surfaces of the fabric are coated with elastomeric composition.

16 Claims, 3 Drawing Sheets

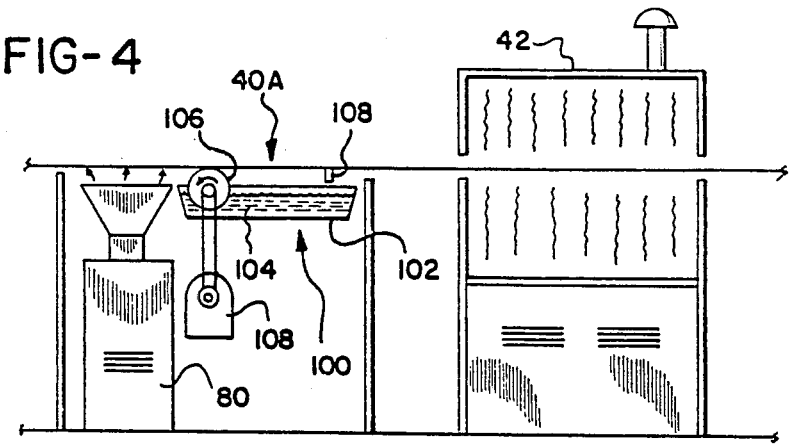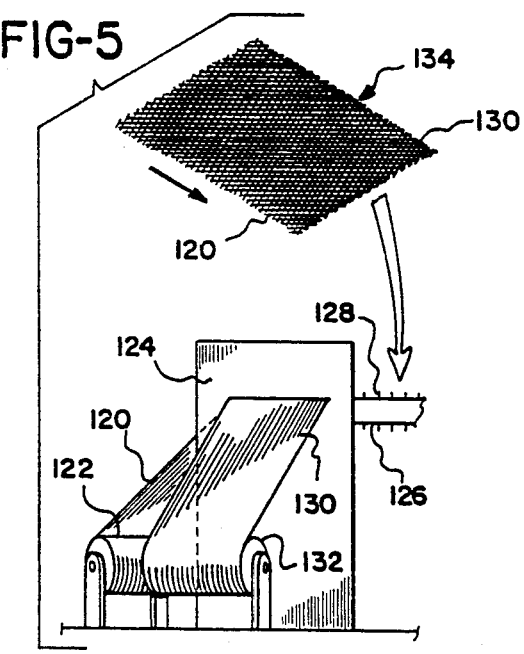

METHOD FOR PRODUCING ELASTOMER-COATED BIAS FABRIC

CROSS-REFERENCE TO RELATED APPLICATION

This application is a divisional patent application of its copending parent patent application, Ser. No. 605,509, filed Apr. 30, 1984, now U.S. Pat. No. 4,622,243, which, in turn, is a combined continuation-in-part of U.S. application Ser. No. 350,969 filed Feb. 22, 1982, now U.S. Pat. No. 4,501,771, and U.S. application Ser. No. 533,098 filed Sept. 6, 1983, now U.S. Pat. No. 3,490,428.

BACKGROUND OF THE INVENTION

1. Field of the Invention

The present invention relates to elastomer-coated bias fabrics of the type employed as reinforcement in such industrial products as power transmission belts, hoses, tires and the like and, more particularly, to a process for manufacturing such fabrics in which the fabric is transversely stretched on a tenter frame while the elastomer is applied to it.

2. Prior Art Statement

Bias-cut fabrics which have previously been coated and impregnated with an uncured, tacky, elastomeric compound, such as a synthetic elastomer, have conventionally been used in the production of power transmission belts, hoses, and the like as a protective cover and reinforcement. It is the common practice to combine the pre-coated bias-cut fabric with the carcass, substrate, or core of the product during the vulcanizing operation, such that heating cures and adhesively bonds the fabric to the rubber base of the product.

Elastomer-coated bias-cut fabrics have been the subject of a number of U.S. patents including:

U.S. Pat. No. 1,323,212 (1919) to Bulley
U.S. Pat. No. 3,784,427 (1974) to Griffin
U.S. Pat. No. 3,832,210 (1974) to Rohlfing
U.S. Pat. No. 4,283,455 (1981) to McGee as well as the following U.S. patents to Delmar D. Long, the inventor herein:

U.S. Pat. No. 4,062,989 (1977) to Long
U.S. Pat. No. 4,116,159 (1978) to Long
U.S. Pat. No. 4,205,559 (1980) to Long et al Bulley discloses a rubber impregnated bias cut fabric for use in a tire carcass. The Bulley fabric is prepared by a calendaring process.

Griffin discloses a method and apparatus for manufacturing an elastomer-coated bias cut fabric wherein a tubular woven fabric is cut spirally at a 45° angle to produce a continuous sheet of fabric which is immersed in a curable binder and transversely stretched on a tenter frame to increase the complementary angle of the warp and weft threads. The binder is cured or otherwise hardened to stabilize the fabric and is subsequently immersion coated with a solution of an elastomer, such as neoprene dissolved in toluene. Thereafter the fabric is dried and cut into strips for application to V-belt cores.

McGee discloses a process which parallels that of Griffin wherein the fabric is coated with an elastomeric composition and then coated with additional elastomer. The details of the additional coating step are not disclosed in the patent, but the fabric is not transversely stretched until after the elastomer has been applied at the additional coating station.

Rohlfing discloses a bias cut fabric which is manufactured from a tubular fabric woven such that when the fabric is cut on the 45° bias there is a minimum of selvage.

Long '989 discloses a method and apparatus for uniformly coating and impregnating a bias-cut woven fabric with a tacky elastomer. The fabric is coated while the fabric is pantographed and maintained in a transversely stretched condition on a tenter frame by sequentially applying a viscous elastomeric coating to the lower and upper surfaces of the fabric inwardly of the edges and by smoothing the coatings to a uniform thickness. It has been known to apply the elastomer to the lower surface of the fabric using an idle roll coater, i.e., a roll coater which is driven solely by the movement of the fabric over the surface of the roll.

Long '559 is directed to a neoprene coating composition useful in the Long '989 process wherein a carboxylated neoprene is tackified with a high boiling aromatic oil.

Long '159 is directed to a coating head for applying viscous coatings such as elastomeric latices to a moving woven web. The coating head employs a pair of elongate manifolds extending across the web which simultaneously coat both faces of the web by extrusion and thereby ensure penetration of the interstices of the fabric by the coating composition. The patent teaches that the supply of coating material to the heads may be varied and that for some webs and coating compositions, the composition can be supplied from the bottom manifold alone and forced up through the web into the upper manifold where it forms a reservoir from which it is applied to the top surface of the fabric.

One of the principal advantages of the process described in Long '989 is its versatility. The process can be adapted to produce fabrics having a wide range of performance characteristics because the fabric is coated in a stretched and supported condition on the tenter frame. By contrast, in processes such as the McGee and Griffin processes, in which the elastomers are applied to the fabric by immersing the fabric in a bath of the elastomer, the coatings applied to each face of the fabric must be the same and the amount of elastomer applied to the fabric and the position of the elastomer on the fabric can only be varied to a limited degree. When the fabric is coated on the tenter frame as taught in Long '989, if desired, different coatings can be applied to each surface of the fabric, the amount of elastomer applied to each surface of the fabric can be adjusted, and the position of the elastomer on the fabric can be controlled. In addition, if desired, the yarn angle can be varied.

3. Discussion of Cross-Referenced Applications

Commonly assigned U.S. patent application Ser. Nos. 350,969 and 533,098, of which this application is a combined continuation-in-part, are incorporated herein by reference. These applications describe processes for manufacturing elastomer-coated fabric in which, after pre-impregnating the fabric with a yarn lubricating composition, a non-tacky latex is applied to both surfaces of the fabric. Downstream, after drying the elastomeric coating, the elastomer on one surface of the fabric is overcoated with a tackified latex. The tackified latex composition is not applied to both sides of the fabric because such latices can bond to mold surfaces when the fabric is cured to a rubber body (such as in the manufacture of a V-belt) and this makes the fabric coated body very difficult to remove from the mold.

In the processes described in the aforementioned applications, a non-tacky elastomer is applied to both sides of the fabric. Typically this is accomplished using a top and a bottom coater but the applications also disclose that the coating can be applied to one surface of the fabric and forced through the fabric to the opposite surface. The latter technique is, however, acknowledged to be a difficult means for producing smooth and uniform coatings.

SUMMARY OF THE INVENTION

While the processes described in the aforementioned applications remain effective processes for manufacturing fabric, the ability of fabric in a transversely stretched condition to pick up elastomeric latex is such that certain improvements in the coating processes are possible. In particular it has been found that it is advantageous to use an externally driven roll coater to coat both surfaces of the fabric. The term "externally driven" means that the roll is driven by means other than the movement of the fabric across the roll.

In accordance with the present invention the roll is driven at a velocity which is different than the velocity of the fabric across the surface of the roll. The roll can be driven at a higher or lower velocity in the same direction as the fabric movement, at a higher or lower velocity in the opposite direction as the fabric movement, or at a quantitatively equal velocity but in the opposite direction of the fabric movement. In each case, the velocity of the roll is different than the velocity of the fabric. In the preferred case the roll is driven in a direction opposite the direction in which the fabric moves across the roll. In accordance with the most preferred embodiment of the invention, the roll coater is driven in the opposite direction as the fabric movement and at a tangential velocity which is equal to the linear velocity of the fabric in the opposite direction.

By driving the roll at a velocity different than the fabric velocity, it is possible to use the roll coater on one surface of the fabric and, at the same time, drive the elastomer through the interstices of the fabric to the opposite surface. In the most preferred case, the fabric is conducted in a horizontal path and the elastomer is introduced to the bottom surface of the fabric using a reversely driven roll coater. The effect of this is to coat the bottom of the fabric and, at the same time, by the reverse action of the roll coater, drive the elastomer up through the interstices of the fabric to the top surface where a thin smooth uniform coating is also obtained. The upper coating is self-metering and does not need to be doctored.

The externally driven roll coating technique used in the present invention insures that the yarn interstices are fully impregnated with elastomer and it enables the fabric manufacturer to control the placement of the elastomer on the surface of the fabric. Specifically, by operating the roll coater under the different conditions described above, it is possible to vary the manner in which the elastomer is deposited on the fabric and thereby control the amount of elastomer applied to each surface of the fabric and adjust the position of the elastomer on the surface of the fabric such that the properties of the fabric can be tailored to meet predetermined needs. By contrast, when top and bottom applicators are used, it is difficult to deliver controlled amounts of elastomer to the surface of the fabric in a uniform and continuous manner since both coaters deliver elastomer to the fabric surface.

The roll coating technique used in the present invention is also advantageous because it minimizes the amount of shear applied to the latex on the surface of the fabric. This is advantageous because it preserves the stability of the latex and reduces fiber fall out and accumulation. Many of the latices that are used to prepare elastomer coated fabrics are stable in their unmodified condition but become less stable when fillers and other additives are added to the latex to improve wear, adhesive characteristics, and the like. In some cases, care must be exercised in applying such modified latices to the fabric. If too much shear is applied to these latices, the latices can break down. The coating technique of the present invention is advantageous in that it opens up the process to the use of modified latices that might not be suitable using other coating techniques. Thus, the fabric manufacturer has more latitude in his selection of latices.

The surface of the fabric opposite the roll coater also has improved coating properties because little shear is applied to that surface during the coating operation. Prior to coating, the fabric is usually vacuumed to remove free yarn fibers that may accumulate as the fabric is coated and cause lumps in the coating. If blade coating or chute coating techniques are used, the fabric is subjected to excessive shear downstream of the vacuuming process and additional fibers may become free from the yarns causing the accumulation problem to re-occur.

Accordingly, one embodiment of the present invention is a method for manufacturing elastomer-coated bias fabric which comprises:

a. pre-impregnating a bias fabric having yarns or fiber bundles and interstices between said yarns or fiber bundles with a liquid composition which facilitates stretching and impregnation of said fabric, b. transversely stretching said fabric while conducting said fabric along a predetermined path, c. applying an elastomeric composition to both surfaces of said fabric while said fabric is maintained transversely stretched and conducted along said path, and d. drying said coated elastomeric composition; wherein the improvement resides in applying said elastomeric composition to one surface of said fabric using a roll coater externally driven at a velocity different than the velocity with which said fabric is conducted across said roll, and forcing said composition through the interstices of said fabric to the opposite surface such that smooth substantially uniform coatings of said elastomeric composition are formed on both surfaces of said fabric.

In accordance with a preferred embodiment of the invention, the fabric is conducted in a horizontal path and the elastomeric composition is applied to the bottom surface of the fabric using a reverse roll coater which is driven in the direction opposite the direction in which the fabric is conducted.

In accordance with a still more preferred embodiment of the invention, the reverse roll coater is driven at a tangential velocity which quantiatively equals the velocity of the fabric in the opposite direction.

In accordance with another embodiment of the invention, on one side of the coated fabric the elastomeric composition is overcoated with a tackified elastomeric composition such as a carboxylated or noncarboxylated elastomeric composition and said overcoat is subsequently dried.

BRIEF DESCRIPTION OF THE DRAWINGS

FIG. 4 is a side elevation, diagramatic view of an alternative second coating station useful in the present invention.

FIG. 5 is an overhead view of an apparatus for forming bias fabric in accordance with another embodiment of the present invention.

DESCRIPTION OF THE PREFERRED EMBODIMENTS

Hereinafter, the present invention will be described with reference to the production of neoprene-coated bias fabrics. Those skilled in the art will understand that the teachings herein are also applicable to forming coated fabrics using such elastomers as styrene-butadiene rubber, acrylics, nitriles, polyurethanes, vinyl resins, natural rubber, etc. Similarly, while the method of the present invention is illustrated using a horizontal coating line, other line orientations are also useful.

The term "bias fabric" as used herein includes plain woven fabric which is cut on the bias (so called bias-cut fabric), bias woven fabric, and non-woven fabric in which the yarns or fiber bundles have a bias orientation. The term is not limited to plain weaves since twill weaves and other weaves can be used.

Figure 1:
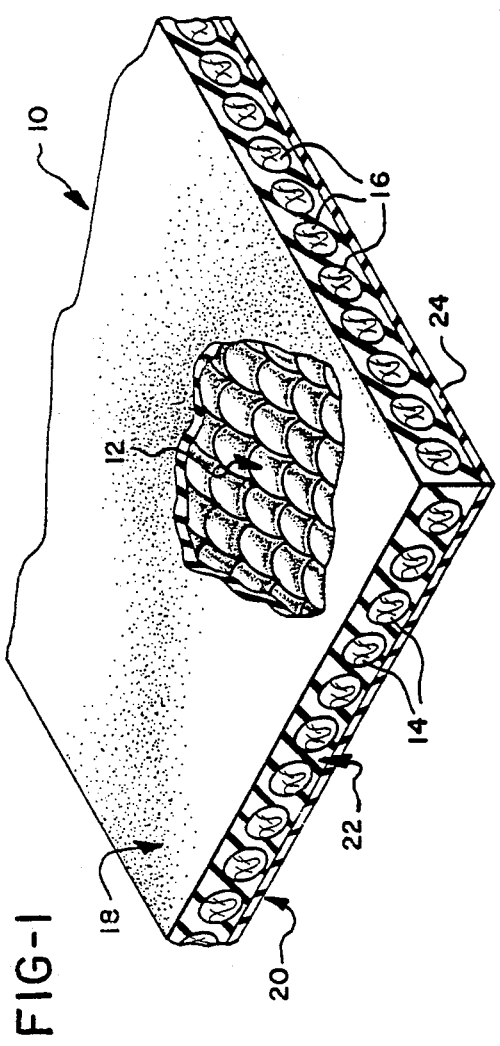
FIG. 1 is a cross-sectional elevational view of one embodiment of the elastomer-coated bias fabric of the present invention.

Referring to FIG. 1, the elastomer-coated bias fabric 10 produced in accordance with one embodiment of the present invention comprises a bias fabric 12 which is transversely stretched such that the angle between the warp threads 14 and the weft threads 16 is greater than 90°. While FIG. 1 illustrates a woven fabric, it should be understood that non-woven fabrics (i.e., fabrics in which the yarn or fiber bundles are not interwoven) can also be used in the present invention. Preferably, the warp and weft threads (or the primary fiber bundle or yarn orientations in the case of non-woven fabrics) are at an angle of about 100° to 135° and more preferably 110° to 120°. The upper surface 18 and the lower surface 20 of the fabric 12 are coated with an elastomeric composition 22. Elastomeric composition 22 is preferably a non-carboxylated elastomer. Elastomeric composition 22 penetrates the yarns in the fabric 20. In the embodiment shown in FIG. 1, the elastomeric composition on the lower surface 20 of the fabric 12 is overcoated with a layer of a tackified elastomeric composition 24.

The bias fabric 12 may be a bias-cut fabric such as is conventionally used as a reinforcement fabric in the manufacture of power transmission belts, hoses and the like. The fiber content, weight and yarn size as well as the fabric construction, can be varied to meet the specific requirements of a particular end use. For example, the fiber content may vary from 100% cotton to 100% polyester with blends therebetween. One often used fabric construction, particularly in belt manufacture, is an 8 ounce, 50% cotton-50% polyester fabric having a 35 by 35 count construction.

Figure 2:
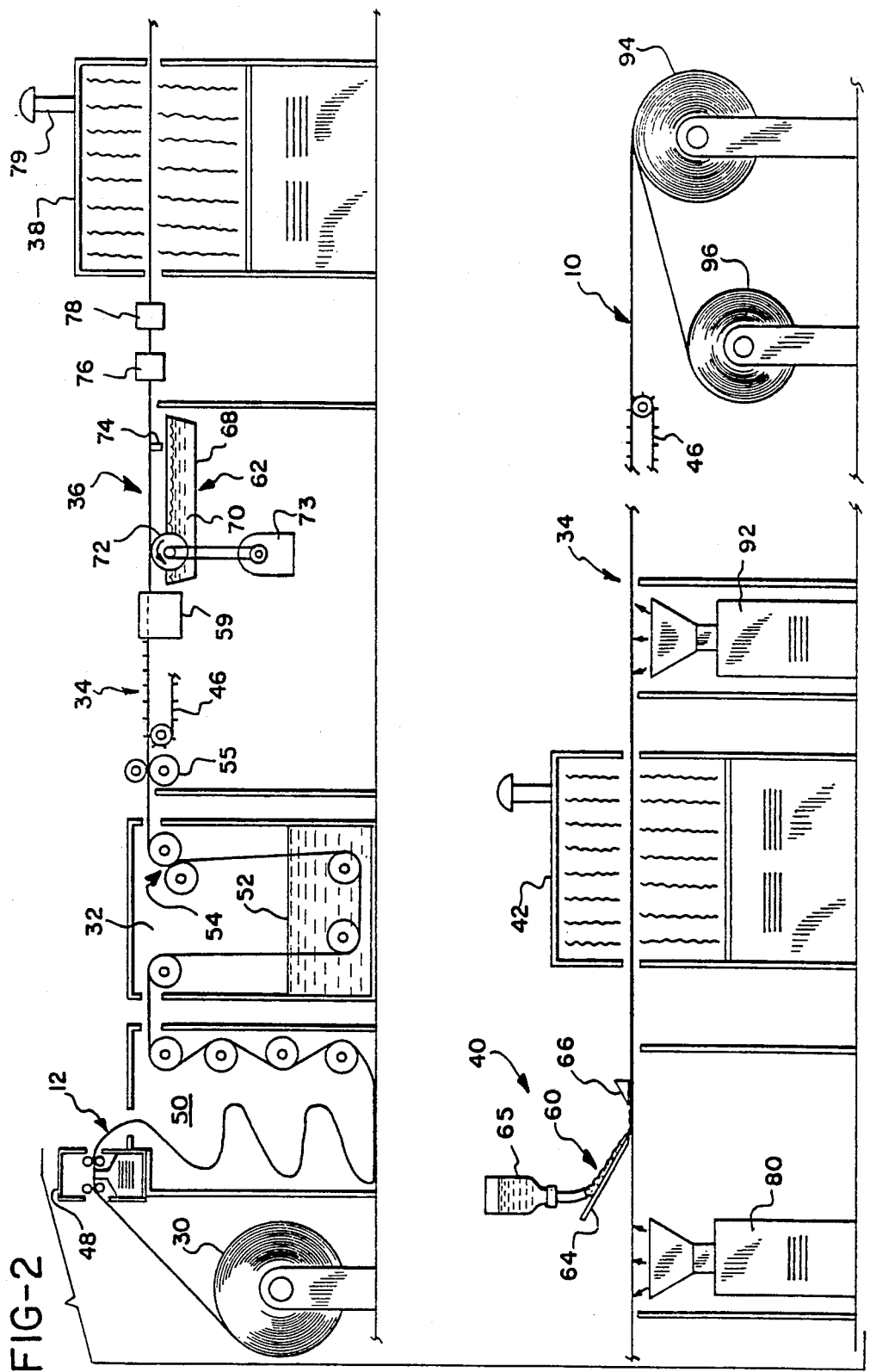
FIG. 2 is a side elevation, diagramatic view of an apparatus for producing elastomer-coated bias fabric in accordance with the present invention.

Referring to FIG. 2 of the drawings, an indefinite length sheet of bias woven fabric is continuously supplied for treatment from a supply source, such as a roll 30. The bias-cut fabric is most conveniently provided, in a known conventional manner, by spirally cutting a tubular woven fabric at an angle of approximately 45° to provide a continuous sheet of fabric having warp and weft threads disposed at right angles to each other and at 45° angles to the longitudinal axis of the sheet. Although certainly not as convenient, the fabric may also be prepared by as cutting a plain woven fabric sheet and seaming the panels obtained along the uncut ends in a manner which is also well known.

The apparatus, as seen in FIG. 2, generally includes a pad 32, an overfeed 55, a tenter frame 34, a first coating station 36, a drying tunnel 38, a second coating station 40 and a drying tunnel 42. The tenter frame 34 is a conventional type well known in the art having spaced, moving chains, indicated schematically by dashed lines 44, 46 (FIG. 3), which are provided with pins for supportably engaging the edges of the fabric to transport the fabric on the tenter frame. Sections of chains in the tenter are angularly adjustable to stretch the fabric in widthwise direction during its movement through the tenter.

As the bias-cut fabric 12 moves from supply roll 30 to the pad 32 it may be cleaned using a vacuum 48 to remove free fibers and collected on a scray 50 prior to entering the pad.

In pad 32 the fabric 12 passes through a bath 52 where it is impregnated with a composition which lubricates the yarns, facilitates stretching, and/or enhances the impregnation of the fabric. In the invention process, pre-impregnation affects a number of conditions including the yarn condition, the penetration of the yarn or fiber bundles by the elastomer, the thread angles and orientation, all of which contribute to providing a satisfactory and reproducible product. The padding process also assists in removing excess warp sizing from the fabric.

The padding bath may contain a low viscosity latex or consist of water. Alternatively, aqueous solutions containing a wetting agent, a fiber lubricant, a softening agent, or a combination thereof can be used. Wetting agents improve the wettability of the fiber by reducing surface tension. One example of a suitable wetting agent is a mixture of methanol and butanol as described in U.S. Pat. No. 3,961,889 to Birch et al. Fiber lubricants are used to enhance fiber-to-fiber slippage and thereby facilitate stretching. A typical example is a polyhydric alcohol such as glycerol or a copolymer of glycerol and maleic anhydride as described in U.S. Pat. No. 3,981,836 to Dangle et al. Softening agents improve fiber bending modulus. Typical examples include fatty acid esters, sulfonated castor oil, and methylated polyoxyalkalene carbonates. Foam reducers are also useful in the padding bath to improve coating consistency.

As the fabric leaves the bath 32, it passes through a mangle 54 where the total wet pickup is reduced. The fabric 12 is next overfed in a conventional manner such as by overfeed rolls 55 onto the first section of the tenter frame 34 where the edges of the fabric are supportably engaged by the pins of the traveling chains 44 and 46 (FIG. 3) of the tenter. The purpose of placing the fabric onto the pins in an overfeed condition is to provide the necessary slack as the fabric is pulled in the transverse direction. The chains in the first section 56 are angularly adjusted about pivot points 58, 59 (FIG. 3) to stretch the fabric in the widthwise direction during its longitudinal movement and thereby increase the angular relationship of the warp and weft threads of the fabric by the desired amount.

Typically, in the production of woven fabrics for V-belt construction, the fabrics may be stretched in the first section of the tenter frame to increase the angle between the warp and weft threads or the yarn or fiber bundles from about 90° to approximately 120°. The rate of the overfeed of the fabric and the angular disposition of the tenter chains are coordinated, in a known manner, to impart the desired angular thread relationship to the fabric during stretching. After stretching, the fabric sheet 12 is transported in a stretched condition on the tenter frame in a generally horizontal path through the first coating station 36.

The first coating station 36 comprises a bottom coater 62. The bottom coater 62 is a reverse roll coater and comprises a trough 68 which is partially filled with coating composition 70 in which a roll 72 rotates. Roll 72 is externally driven in a counter-clockwise direction (opposite the direction in which the fabric moves in FIG. 2) by a motor 73. As roll 72 rotates, it carries composition from trough 68 upward and transfers it to the underside of fabric 12. The reverse direction of roll 72 also forces the coating composition through the interstices of the fabric to the top surface where a thin uniform coating is formed. As pointed out above, roll 72 can also be driven in the same direction as the fabric movement but at a different velocity.

The roll 72 is preferably about 6 to 12 inches in diameter. Smaller or larger diameter rolls can also be used but generally with less efficiency. By adjusting the speed of roll 72 relative to the speed of the fabric 12, the amount and position of the coating on the fabric can be adjusted. Downstream of roll 72 is a vertically adjustable scraper bar 74 which doctors the bottom coating and returns the excess composition to the trough. The pre-impregnated and pantographed fabric is thus undercoated, topcoated and scraped from the underside all within the dimension of trough 68. This assures that the upper and lower coatings contact through the interstices of the fabric and provides a more intimate bonding of the coatings to the fabric and of the fabric to the product rubber base.

The coating composition applied at coater 62 typically has a viscosity of about 1,000 to 3,000 cps. The viscosity used will depend on the properties of the coating composition (generally its thixotropy) and the construction of the fabric so as to obtain good penetration of the interstices of the fabric and a smooth and uniform coating. The amount (dry weight) of elastomeric coating composition applied to the fabric will vary with the fabric construction, e.g., the tightness of the weave and the fabric weight, the speed with which the fabric traverses the roll coater, the speed of the roll coater, and the pressure of the roll coater against the fabric. The coating amount is also in part a function of the amount of composition the particular fabric tends to pick up. These conditions are adjusted to obtain the coating characteristics that are desired.

The web is preferably conveyed through the first coating station at a rate of about 2 to 20 yds/min and the roll coater is driven at a rate which provides a tangential velocity of about 2 to 20 yds/min provided that the speed of the roll and the speed of the web are different or the web and the roll are driven in opposite directions. Preferably the roll coater and the web move by each other at equal speeds but in opposite directions. By increasing the speed of the roll and the pressure of the roll against the fabric, more composition is forced up through the fabric to the opposite side thereof.

Referring again to FIG. 2, as the coated fabric proceeds further into the tenter frame to the points 76 and 78 it is gradually stretched further in the transverse direction. This assures that the coated fabric is maintained in a tight condition and continues the angular build up in the fabric. Thereafter the fabric passes through a first drying tunnel 38 such as an oven where it is dried. The tunnel is appropriately vented as shown at 79.

Using certain elastomers such as neoprene latices, drying conditions must be carefully controlled to avoid the formation of a skin having a low vapor transmission rate on the surface of the coating. Humid conditions are preferred and for this reason super heated steam is generally used to heat the drying tunnel. A suitable drying temperature in tunnel 38 is in the range of about 250° to less than 320° F. At temperatures of 320° F. and above a neoprene composition tends to skin over and bubble.

At this point in the manufacturing process, the fabric is useful for some applications such as in gaskets, diaphragms and the like.

In the manufacture of V-belts, reinforcement fabric having a highly tacky uncured rubber-coated surface, which securely adheres the fabric to the belt body is used. Hereinafter the present invention will be described with reference to the production of a fabric which has one side coated with a tackified elastomer. Other modifications of the basic process are possible, however, in which other coatings are applied to one or both surfaces of the fabric.

Upon exiting the drying tunnel 38, the coated fabric 12 passes over an air blower 80 and from there to the second coating station 40. The air blower cools the elastomer coating to a temperature suitable for coating with a tackified elastomer. If the coating is not adequately cooled using an air blower or equivalent means, temperature build up in the coating may cause the subsequently coated elastomeric composition to "skin over" upon contact with the coated fabric and interfere with the formation of a smooth coating having good adhesion.

In the illustrated coating apparatus, the second coating station consists of a top coater 60 comprising a movable chute 64 fed by a latex supply means 65 and a standard doctor blade 66 having four inch metal projections on each side thereof and at right angles thereto which prevent the latex from escaping to the tenter pins. The movable chute 64 is positioned immediately upstream of the doctor blade 66 at a 60° angle to the vertical axis, apexing at the fabric. The purpose of the chute is to minimize the amount of latex on the fabric prior to the doctor blade and thereby provide better control of the latex deposition. The latex flows down the chute and onto the fabric through an elongated slot formed between the chute 64 and the doctor blade 66.

Coating conditions are adjusted at the coater 60 to apply a relatively thin coat of the tackified elastomer which sits up on the surface of the previously coated elastomeric layer without forcing the tackified elastomeric composition into the fabric. Controlling the deposition of the tackified elastomer in this manner, makes the fabric less difficult to handle than if a thick coating of the tackified composition is applied to the fabric. This places the composition on the surface of the fabric where it is most effective in adhering the fabric to a rubber base member. For this reason the tackified latex composition used in the present invention preferably has a relatively high viscosity, for example, a viscosity on the order of 30,000 to 80,000 cps (preferably about 70,000 cps) is used. In general, a tackified elastomer is applied in dry amount of about 1 oz./sq.yd.

After being coated with the tackified elastomer, the fabric passes through a second drying tunnel 42 where the elastomer is dried to a tacky state. This operation is not as sensitive as the first drying operation and is typically conducted at temperatures on the order of 225° to 275° F. The temperatures are typically lower in the second drying tunnel 42 than those employed in the first drying tunnel 38 because the second coating composition usually contains higher solids and therefore there is less water to remove. Furthermore, instead of drying the top and bottom of the fabric as shown, only the coated side of the fabric needs to be dried.

The fabric passes from drier 42 over air blower 92. As the fabric emerges from the dryer, the uncoated edges are cut from the fabric by suitable cutting means, such as rotating knives (not shown), and the fabric is collected in a batcher or a simple take off roll 94. To prevent adhesion of the layers of the coated fabric and facilitate handling of the fabric, a sheet of plastic film such as polyethylene, is supplied from a roll 96 to separate the fabric layers. In this regard, blower 92 can be used to cool the coated fabric to a temperature sufficiently below the melt point of the polyethylene that the polyethylene can be readily removed from the fabric upon its end use.

Preferably the polyethylene is applied as soon as permissible since the polyethylene can provide additional support for the fabric. Since the applied elastomeric compositions are dried but not cured, there is a large degree of flexibility in the fabric. This degree of flexibility is one of the desirable features of the fabric. It enables the fabric to more readily conform to the product shape in which it is used. By applying the polyethylene as soon as possible after the fabric leaves the tenter frame, undesirable movement of the yarns (e.g., necking down) can be prevented.

In accordance with another embodiment of the invention, the tackified elastomer can be applied to the bottom of the fabric at second coating station 40A using a reverse roll coater as shown in FIG. 4. There, the blower 80 and the drying tunnel 42 from FIG. 2 are shown with a reverse roll coater 100 at the second coating station. As at the first coating station, the reverse roll coater includes a trough 102 containing elastomer 104 in which a roll 106 is rotationally driven by a motor 108. Downstream of roll 106 but within the trough 102, a scraper means 108' is positioned to smooth the coating. The same considerations which govern the use of the first roll coater 40 apply to the second roll coater 40A. Thus, roll 106 is driven at a velocity which is different than the velocity with which the fabric crosses the roll surface.

In accordance with another embodiment of the present invention, the web or bias fabric 12 can also be formed using the lay-in procedure described in commonly assigned U.S. application Ser. No. 486,650 to Long and Hill. As shown in FIG. 5, thread means 120 (i.e., threads, yarns or fiber bundles) can be fed in parallel running beam fashion from a supply thereof 122 into an area 124 wherein the same are cut and laid across the tenter frame 126 from one side thereof to the other side thereof and held thereon by the conventional tenter pins 128 so that each thread means extends from one side of the tenter frame to the other at the desired angle relative to the longitudinal axis of the tenter frame. Similarly, a second beam of the thread means 130 can be fed from a supply thereof 132 into the same area and cut and laid across the tenter frame 126 on top of the previously laid beam of thread means at an angle relative thereto so that the second beam extends from one side of the tenter frame to the other side thereof at a second desired angle relative to the longitudinal axis of the tenter frame so as to produce a non-woven bias overlay 134.

In general, the elastomeric compositions used in the present invention are designed to provide a medium cure rate and to provide a uniform coating which penetrates the yarn bundles and fills the interstices of the fabric. The elastomeric latex compositions used in the present invention may be formulated from commercially available components employed in elastomeric adhesive systems such as cross-linking agents, emulsification aids, antioxidants, catalysts, thickeners, lubricants, fillers, and the like depending on the coating properties desired and the particular end use. A commercially available neoprene latex from which it is convenient to formulate a neoprene latex composition for use in the present invention is DuPont Latex 654. This latex contains about 60% solids and can be used in formulating both the tackified and non-tackified coating compositions. Either a sulfur reactive system or a metallic oxide reactive system can be used as a curing agent.

Several problems arise in providing an elastomer coated fabric having a tacky surface. Tackified latices are generally so unstable that they are not amenable to industrial coating. The presence of the tackifying agent interferes with the maintainance of the micelle such that upon the application of shear forces to the latex during coating, the micelle breaks down and the latex agglomerates. Somewhat stable latices can be formed when a tacky polymer is mixed with an elastomer, but the coatings which are produced from these latices do not have a high cured adhesion strength. Relatively stable tackified latices can be prepared from carboxylated elastomers because the carboxyl groups tend to stabilize the micelles. However, the carboxyl groups in these elastomers also react with metal surfaces such as the surface of a mold belt. As a result, reinforcing fabrics that are coated on both faces with tackified carboxylated neoprene are not entirely desirable.

A number of tackified agents and techniques can be used to form tackified elastomeric compositions. For example, compositions can be tackified by the addition of a high boiling aromatic oil as disclosed in U.S. Pat. No. 4,205,559. The preferred means of tackifying the copolymer, however, is to add to the copolymer a tacky resin or rosin. Preferred tackifying agents of the latter type are rosins such as Aquatac 8005, a tall oil rosin manufactured by Sylvachem Corp., Panama City, Fla.

The elastomeric system applied to the fabric preferably contains a chemical linking agent which reacts chemically with the fabric and the elastomer to form a chemical bridge between them, which bonds the elastomer to the fabric. In most cases fabrics such as cotton and polyester fabrics contain reactive groups such as carboxyl, hydroxyl, amino or amido groups which participate in forming various chemical bonds used in binding dyes and other reactive substances to the fabric. These reactive groups are used to bond the elastomer to the fabric using a chemical linking agent which reacts with the fabric groups and the elastomer to form a bridge between them. The chemical linking agent used most often in the present invention is melamine-formaldehyde resin, but other agents such as urea-formaldehyde resins and carbamates could also be used. These agents are frequently encountered in the textile art as yarn stabilization agents.

In the manufacture of fabrics for reinforcing power transmission belts, it has been found desirable to incorporate polyethylene in the elastomeric latex composition found on the surface of the belt as a lubricant to control the frictional coefficeint of the belt. The polyethylene used has a relatively low melt index such that as the belt heats up the polyethylene melts and gradually migrates to the surface of the belt where it is able to reduce the coefficient of friction. This is important because if the coefficient of friction becomes too high as the belt is run, the belt will grab the sheave in which it runs and the belt will break upon a sudden start up or stop. By incorporating polyethylene in the fabric coating, the polyethylene will continuously lubricate the surface of the belt. The amount of polyethylene used in the compositions will vary with the frictional properties desired. Polyethylenes having a melt point greater than about 215° F. up to about 285° F. are suitable for use in the present invention.

The invention is illustrated in further detail by the following example of a process for forming neoprene-coated, bias-cut fabric.

EXAMPLE

An 8 oz./sq.yd. tubular woven fabric composed of 50% cotton-50% polyester threads having a 35×35 pick construction was spirally cut on a 45° angle to produce a continuous sheet of woven fabric in which the warp and weft yarns were disposed at 90° D to each other. The fabric was fed to a pad tank containing Latex Formulation A below and into the pad. The components of the latex formulation are listed in the order of their addition for compounding.

| Latex Formulation A | lbs/100 gal. mix |
| --- | --- |
| Water | 511 |
| Latex 654 (60% solids neoprene latex available from E. I. DuPont de Nemours, Wilmington, Delaware) | 195 |
| Antioxidant (Wing-Stay-L dispersion, The Goodyear Tire & Rubber Co., Akron, Ohio) | 5 |
| KD 40 (zinc oxide) | 10 |
| Sulfur | 1 |
| Fabritone PE (Polyethylene, melting point: about 219° F.) | 86 |
| Carbon Black (Monocol 20-72 Mono Chem Corp., Atlanta, Texas)[1] | 57 |

[1]In fabrics for V-belt manufacture, the neoprene latex compositions contain carbon black as an antistatic agent.

The nip pressure was adjusted such that a total wet pick up in the pad did not exceed 80%.

The fabric was thereafter continuously overfed up to 50% onto a tenter frame and stretched in the first zone to produce a thread angle of approximately 120°. The stretched fabric was passed on the tenter frame through the coating apparatus shown at the first coating station in FIGS. 2 and 3 where the following Latex Formulation B was applied to the top and bottom surfaces using a reverse roll coater as described above. Again, the components are listed in the order of their addition upon comounding.

| Latex Formulation B | lbs/100 gal mix |
| --- | --- |
| Water | 327 |
| DuPont Latex 654 | 297 |
| Antioxidant (as in Formulation A) | 7 |
| KD 4 | 15 |
| Sulfur | 2 |
| Polyethylene (same as in Latex Formulation A) | 61 |
| Carbon Black (Monocol 20-72) | 149 |
| Polyacrylate thickener (Paragum 131 Parachem Corp.) | 36 |

Figure 3:
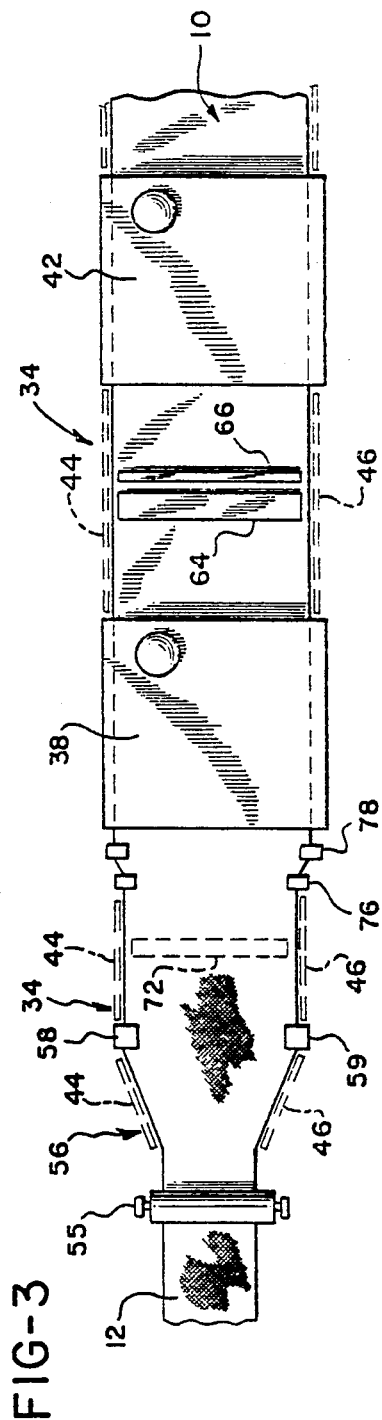
FIG. 3 is an overhead plan view of the coating and tenter frame portions of the apparatus of FIG. 2.

After coating, the fabric was dried to a nonflowable state by passing it through an oven set at 290° F. Upon exiting the oven the fabric was cooled to about 200° F. by blowing air over the fabric. The top surface of the fabric was then coated with the following Latex Formulation C, a tackified, carboxylated neoprene latex, using a coater as shown in FIGS. 2 and 3.

| Latex Formulation C | lbs/100 gal. mix |
| --- | --- |
| Hot Water 135° F. | 141 |
| KD 40 | 21 |
| Sulfur | 3 |
| KD 4 (Antioxidant) | 8 |
| Tall oil | 316 |
| DuPont Latex 654 | 358 |
| Carbon Black (Monocol 20-72) | 38 |

This coating was subsequently heated to 250° F. in an oven and dried to a nonflowable tacky state. Upon leaving the oven the uncoated edges of the fabric were removed and the fabric collected with a separation sheet of polyethylene in roll form. A very supple fabric good for use in manufacturing wrapped molded belts was obtained.

Having described the invention in detail and by reference to preferred emobodiments thereof, it will be apparent that modifications and variations are possible without departing from the scope of the appended claims.

What is claimed is:

1. In a method for manufacturing elastomer-coated, bias fabric comprising:
   a. providing a bias fabric having opposed surfaces, yarns or fiber bundles, and interstices between said yarns or fiber bundles,
   b. transversely stretching said fabric while conducting said fabric along a predetermined path,
   c. applying an elastomeric composition to both surfaces of said fabric while said fabric is conducted along said path in a transversely stretched condition, and
   d. drying said coated elastomeric composition; the improvement comprising:
   applying said elastomer composition to both surfaces of said fabric by coating said elastomeric composition on one surface of said fabric and forcing said elastomeric composition through the interstices of said fabric to the opposite surface using a roll coater which extends across said predetermined path and is externally driven at a velocity different than the velocity with which said fabric is conducted across said roll such that thin uniform elastomeric coatings which penetrate the interstices of said fabric are formed on both surfaces of said fabric.

2. The method of claim 1 wherein said fabric is conducted in a horizontal path and said elastomeric composition is applied to the bottom surface of said fabric with said roll coater.

3. The method of claim 2 wherein said roll coater is externally driven in a direction opposite the direction in which said fabric is conducted.

4. The method of claim 2 wherein said roll coater is externally driven in the same direction as said fabric and at a higher velocity than the velocity of said fabric.

5. The method of claim 1 which further comprises the steps of:
   e. overcoating said elastomeric composition on one surface of said fabric with an elastomeric composition containing a tackifying agent, and
   f. drying said overcoated elastomeric composition to a solid tacky essentially non-flowable state.

6. The method of claim 1 wherein said fabric is transversely stretched such that the angle between complementary yarns, threads or fiber bundles is about 100° to 140°.

7. The method of claim 1 wherein said elastomeric composition is a latex composition.

8. The method of claim 1 wherein said fabric is pre-impregnated with a latex.

9. The method of claim 1 wherein said fabric is pre-impregnated with an aqueous solution containing a wetting agent or a fiber lubricant.

10. The method of claim 1 wherein said fabric is a bias woven fabric.

11. In a method for manufacturing elastomer-coated, bias fabric comprising:
   providing a bias fabric having opposed surfaces, yarns or fiber bundles, and interstices between said yarns or fiber bundles,
   transversely stretching said fabric while conducting said fabric along a horizontal path,
   applying an elastomeric composition to both surfaces of said fabirc while said fabric is conducted along said path in a transversely stretched condition, and
   drying said coated elastomer composition, the improvement comprising:
   forming said bias fabric by disposing a first substantially planar layer of parallel running thread means in superimposed relation with a second substantially planar layer of parallel running thread means such that the thread means in said first layer cross the thread means of said second layer at an angle greater than 90°, and
   applying said elastomeric composition to both surfaces of said fabric by coating said elastomeric composition on the bottom surface of said fabric and forcing said elastomeric composition upwards through the interstices of said fabric using a roll coater driven at a velocity different than the velocity with which said fabric is conducted such that thin uniform elastomeric coatings which penetrate the interstices of said fabric are formed on both the top and bottom surfaces of said fabric.

12. The method of claim 11 wherein said roll coater is driven in a direction opposite the direction in which said fabric is conducted.

13. The method of claim 11 which further comprises the steps of:
   overcoating said elastomeric composition on one surface of said fabric with an elastomeric composition containing a tackifying agent, and
   drying said overcoated elastomeric composition to a solid tacky essentially non-flowable state.

14. The method of claim 11 wherein the angle between said first and second thread means is about 100° to 140°.

15. The method of claim 1 wherein said elastomeric composition is a latex.

16. The method of claim 13 wherein said elastomeric composition containing said tackifying agent is applied to the bottom surface of said fabric.

* * * * *